US011491999B2

(12) United States Patent
Urano et al.

(10) Patent No.: US 11,491,999 B2
(45) Date of Patent: Nov. 8, 2022

(54) ADJUSTING AN OPERATING MODE OF A VEHICLE BASED ON AN EXPECTED RESOURCE LEVEL

(71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 48 days.

(21) Appl. No.: 16/406,678

(22) Filed: May 8, 2019

(65) Prior Publication Data
US 2020/0353944 A1 Nov. 12, 2020

(51) Int. Cl.
*B60W 50/08* (2020.01)
*B60L 58/12* (2019.01)
*G05D 1/00* (2006.01)
*B60W 50/00* (2006.01)
*B60K 6/22* (2007.10)

(52) U.S. Cl.
CPC ............ *B60W 50/08* (2013.01); *B60L 58/12* (2019.02); *G05D 1/0088* (2013.01); *B60K 6/22* (2013.01); *B60W 2050/007* (2013.01); *B60W 2400/00* (2013.01); *B60W 2510/244* (2013.01); *B60W 2556/00* (2020.02); *B60Y 2200/91* (2013.01); *B60Y 2200/92* (2013.01); *B60Y 2300/91* (2013.01)

(58) Field of Classification Search
CPC ............ B60W 50/08; B60W 2556/00; B60W 2050/007; B60W 2400/00; B60W 2510/244; B60L 58/12; B60L 2260/32; B60L 2260/46; B60L 2260/52; G05D 1/0088; B60K 6/22; B60Y 2200/91; B60Y 2200/92; B60Y 2300/91; Y02T 10/70

See application file for complete search history.

(56) References Cited

U.S. PATENT DOCUMENTS

| 9,754,325 | B1 | 9/2017 | Konrardy et al. |
| 9,884,631 | B2 | 2/2018 | James et al. |
| 10,095,236 | B1 | 10/2018 | Ferguson et al. |
| 10,144,290 | B2 | 12/2018 | Jang et al. |
| 2017/0315557 | A1* | 11/2017 | Vogt ................. B60L 58/12 |
| 2017/0355371 | A1* | 12/2017 | Higgins ............ B60W 40/12 |
| 2018/0173219 | A1* | 6/2018 | Lee .................. G05D 1/0088 |
| 2018/0347997 | A1* | 12/2018 | Fujimura ......... G01C 21/3697 |
| 2019/0039609 | A1* | 2/2019 | Wood ................. G08G 1/166 |
| 2019/0226861 | A1* | 7/2019 | Schimik ........... G01C 21/3469 |

(Continued)

FOREIGN PATENT DOCUMENTS

WO     2017018850 A1     2/2017

*Primary Examiner* — Abdhesh K Jha
*Assistant Examiner* — Alexander George Matta
(74) *Attorney, Agent, or Firm* — Seyfarth Shaw LLP (57) ABSTRACT

A method for controlling an operating mode of a vehicle is presented. The method includes determining a current range of the vehicle while the vehicle is operating in a first operating mode. The method also includes determining a distance to a destination. The method further includes controlling the vehicle to operate in a second operating mode instead of the first operating mode when the range is less than the distance to the destination.

11 Claims, 6 Drawing Sheets

(56) References Cited

U.S. PATENT DOCUMENTS

2019/0286131 A1* 9/2019 Sasaki .................. B60W 50/08
2020/0201338 A1* 6/2020 Wang .................... H04W 4/029
2020/0317084 A1* 10/2020 Schaffer ................. B60L 53/64

* cited by examiner

ADJUSTING AN OPERATING MODE OF A VEHICLE BASED ON AN EXPECTED RESOURCE LEVEL

BACKGROUND

Field

Certain aspects of the present disclosure generally relate to adjusting a vehicle's operating mode and, more particularly, to a system and method for adjusting the vehicle's operating mode based on a current resource level and current resource use.

Background

Vehicles are powered by different types of systems. For example, vehicles may be powered by an electric system, a hybrid system (e.g., combustion engine and electric engine), or a combustion system. The electric and hybrid systems may be powered by one or more batteries integrated with the vehicle. The batteries may also power other vehicle components, such as lighting, instrument panels, a radio, sensors, etc.

The amount of resources, such as electricity, used by a vehicle may vary based on an operating mode. In most cases, an autonomous mode uses more resources in comparison to a manual mode or a semi-autonomous mode. To prevent stall conditions, it is desirable to monitor current resource use and adjust an operating mode in view of available resources.

SUMMARY

In one aspect of the present disclosure, a method for controlling an operating mode of a vehicle is disclosed. The method includes determining a current range of the vehicle while the vehicle is operating in a first operating mode. The method also includes determining a distance to a destination. The method further includes controlling the vehicle to operate in a second operating mode instead of the first operating mode when the range is less than the distance to the destination.

In another aspect of the present disclosure, a non-transitory computer-readable medium with non-transitory program code recorded thereon is disclosed. The program code is for controlling an operating mode of a vehicle. The program code is executed by a processor and includes program code to determine a current range of the vehicle while the vehicle is operating in a first operating mode. The program code also includes program code to determine a distance to a destination. The program code further includes program code to control the vehicle to operate in a second operating mode instead of the first operating mode when the range is less than the distance to the destination.

Another aspect of the present disclosure is directed to an apparatus for xxxx. The apparatus having a memory and one or more processors coupled to the memory. The processor(s) is configured to determine a current range of the vehicle while the vehicle is operating in a first operating mode. The processor(s) is also configured to determine a distance to a destination. The processor(s) is further configured to control the vehicle to operate in a second operating mode instead of the first operating mode when the range is less than the distance to the destination.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

The amount of resources, such as electricity or fuel, used by a vehicle may vary based on an operating mode. For example, an autonomous mode may use more modules and/or sensors in comparison to a number of modules and/or sensors used in a manual mode. The modules may include, for example, a path planning module, localization module, and/or an object tracking module. The sensors may include, for example, a red-green-blue (RGB) camera, a RADAR sensor, and/or a LiDAR sensor.

The modules and sensors may consume resources, such as electricity stored in a vehicle's battery. As such, when operating in an autonomous mode, the vehicle uses more resources (e.g., electricity) in comparison to a manual mode. The increased resources use increases a drain of the battery.

In the manual mode, a human driver manually operates (e.g., controls) the vehicle. One or more modules and/or sensors may be disabled during the manual mode. For example, the RADAR and/or LiDAR sensors may be disabled during the manual mode. In the autonomous mode, a vehicle control system operates the vehicle without human intervention.

A vehicle may also operate in a semi-autonomous mode. In the semi-autonomous mode, the human may operate the vehicle and the vehicle control system may override the human's commands to prevent a collision or to obey one or more traffic rules. The semi-autonomous mode may use more resources in comparison to the manual mode and fewer resources in comparison to the autonomous mode.

Due to one or more conditions, a vehicle's expected time to reach a destination may be delayed. For example, unforeseen traffic or weather along a route may increase the vehicle's travel time to a destination. If a delay extends beyond a threshold, the vehicle's resources (e.g., battery power, fuel, etc.) may be depleted before the vehicle reaches an intended destination. The depleted resources may cause the vehicle to stall and inconvenience the occupants. It is desirable to conserve resources to prevent a potential stall.

Aspects of the present disclosure are directed determining whether to adjust a vehicle's operating mode based on a current resource level and current resource use. In one configuration, when operating in an autonomous mode, the vehicle determines a current resource level as well as a current resource use. The current resource use may be the current electricity used by modules and sensors for the autonomous mode. Additionally, the vehicle estimates an amount of resources necessary to reach the destination.

In one configuration, if the estimated resource level will be less than the threshold before the vehicle arrives at the destination, the system switches an operating mode (e.g., from the autonomous mode to the manual mode). As discussed, the manual mode uses less resources than the autonomous mode. Therefore, by switching to the manual mode, the system may use the additional resources to extend the range of the vehicle.

In some cases, the vehicle may still not reach its destination after switching the operating mode. In this case, the system may determine a distance to the nearest charging station (e.g., refueling station). The system may then guide the vehicle to the nearest charging station. The vehicle may navigate to the nearest charging station in one of the operating mode, dependent on a range of the operating mode.

Figure 1:
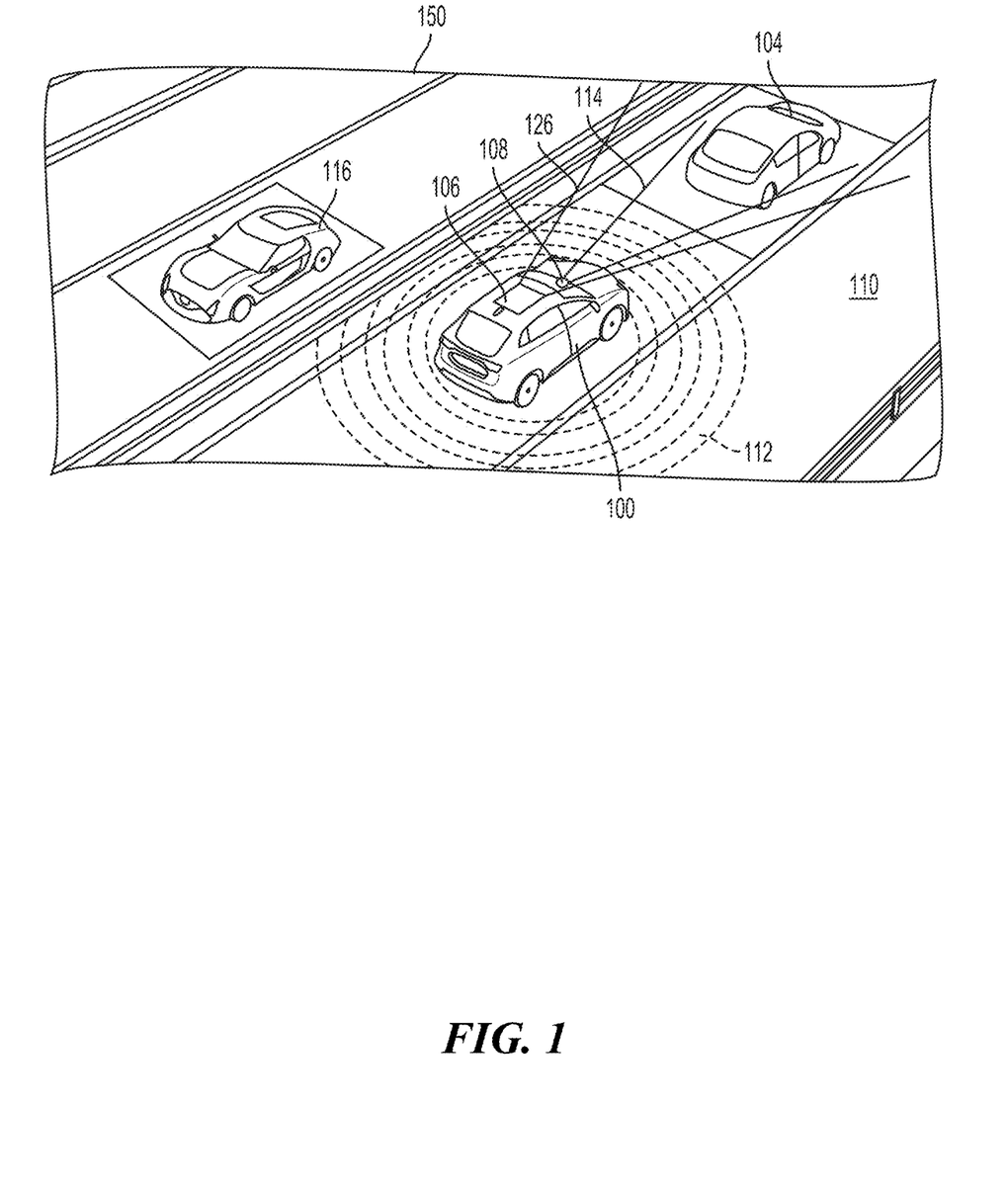
FIG. 1 illustrates an example of a vehicle in an environment according to aspects of the present disclosure.

FIG. 1 illustrates an example of a vehicle 100 (e.g., ego vehicle) in an environment 150 according to aspects of the present disclosure. In the present example, the vehicle 100 is an autonomous vehicle. As shown in FIG. 1, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D RGB camera, and a LIDAR sensor 106. Other sensors, such as RADAR and/or ultrasound, are also contemplated. Additionally, or alternatively, the vehicle 100 may include one or more additional 2D cameras and/or LIDAR sensors. For example, the additional sensors may be side facing and/or rear facing sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in an environment. The LIDAR sensor 106 may vertically and horizontally scan the environment. In the current example, the artificial neural network (e.g., autonomous driving system) of the vehicle 100 may extract height and/or depth features from the first output stream. The autonomous driving system of the vehicle 100 may also extract height and/or depth features from the second output stream.

The information obtained from the sensors 106, 108 may be used to navigate the vehicle 100 along a route when the vehicle 100 is in an autonomous mode. The sensors 106, 108 may be powered from electricity provided from the vehicle's 100 battery (not shown). The battery may also power the vehicle's motor. One or more sensors 106, 108 may be disabled during manual operation (e.g., manual mode). That is, all sensors 106, 108 may be disabled during manual operation or one or more sensors 106, 108 may be selectively disabled during manual operation.

Figure 2A:
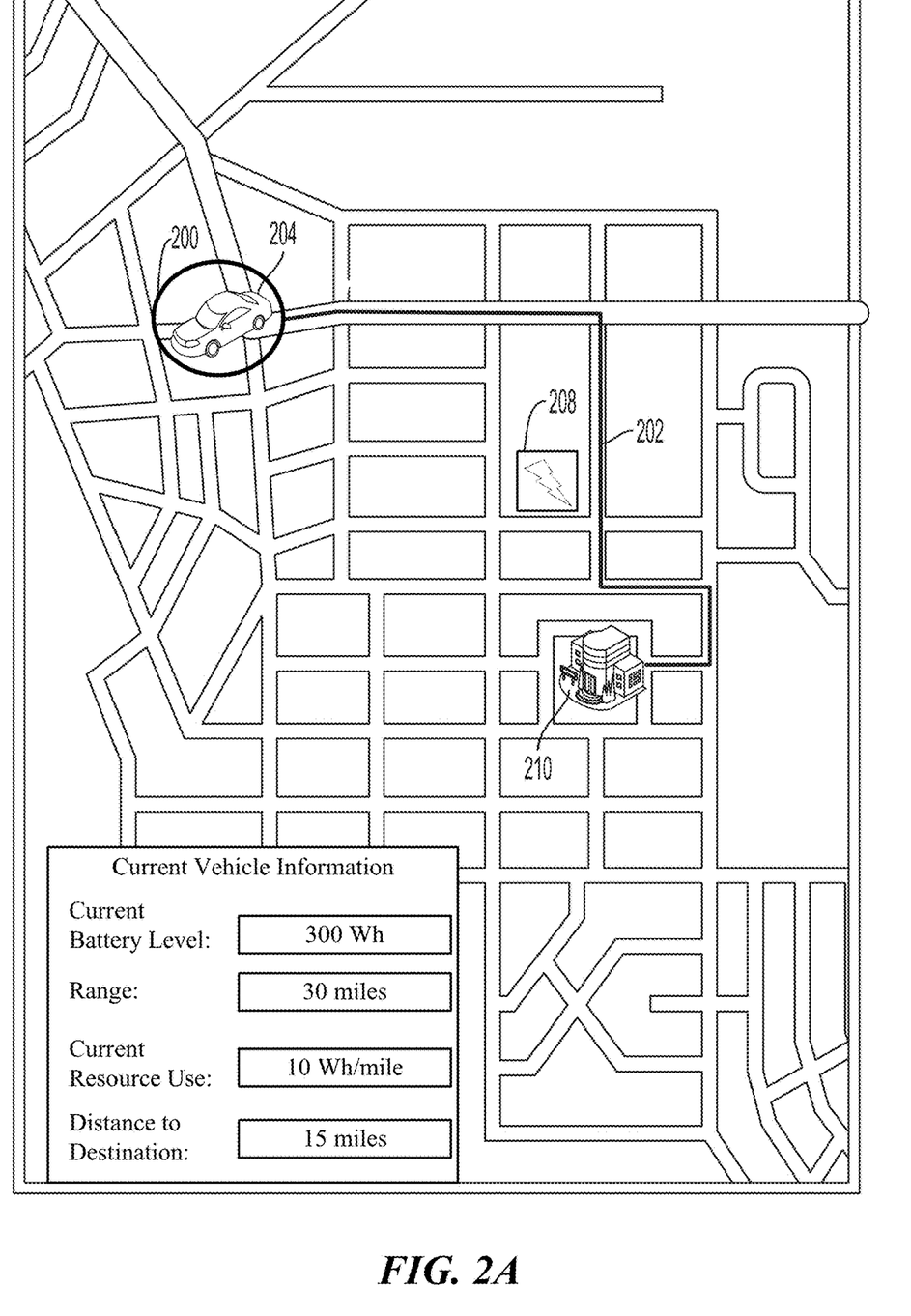
FIGS. 2A and 2B illustrate examples of adjusting an operating mode of a vehicle according to aspects of the present disclosure.

FIG. 2A illustrates an example of adjusting an operating mode of a vehicle 204 according to aspects of the present disclosure. As shown in FIG. 2A, a vehicle 204 may start a route 202 from an initial location 200 to a destination 210. The route 202 may be planned by a route planning system (e.g., route planning module) when the vehicle is operating in a manual mode, a semi-autonomous mode, or an autonomous mode.

In this example, the vehicle 204 may be a mobility as a service (MAAS) vehicle that receives a reservation from a customer requesting to be dropped off at the destination 210. Alternatively, the vehicle 204 may be a personal vehicle and the driver has entered the destination 210. In both cases, the vehicle 204 is intended to navigate the route 202 autonomously.

The route planning system may also determine the vehicle's 200 current information. The vehicle's 200 current information may include a current battery level, a current resource use (e.g., a current electricity use), a range (e.g., a distance that can be traveled based on the current battery level and the current resource use), and a distance to the destination 210. In the example of FIG. 2A, the current battery level is 300 watt-hours (Wh), the current resource use is 10 Wh/mile, the range is 30 miles, and the distance to the destination 210 is 15 miles. The values for the battery level and the current resource are exemplary. Aspects of the present disclosure are not limited to a vehicle with the battery level and the current resource use values shown in FIGS. 2A and 2B.

In one configuration, the vehicle operating mode system determines a difference between the current range (e.g., 30 miles) and the distance to the destination 210 (e.g., 15 miles). If the current range is greater than the distance to the destination, the vehicle 204 may proceed to the destination 210 in the autonomous mode. If the current range is less than the distance to the destination, the destination 210 may be changed to a charging station 208 and/or the vehicle's 204 operating mode may be changed. The operating mode may change from an autonomous mode to a semi-autonomous mode or a manual mode, depending on the range provided by each operating.

In another configuration, prior to embarking on the route 202, the vehicle operating mode system determines whether the vehicle may operate in the manual mode, the semi-autonomous mode, or the autonomous mode. For example, if the current range is greater than the distance to the destination 210, the vehicle 204 may provide the occupant with an option for operating in either the manual mode, the semi-autonomous mode, or the autonomous mode. If the range is less than the distance to the destination 210, prior to embarking on the route 202, the destination 210 may be changed to a charging station 208 and/or the vehicle 204 may be limited to operating in the manual mode or a semi-autonomous mode.

The vehicle operating mode system may monitor the current range and the distance to the destination 210 while the vehicle 204 is traveling the route 202. As discussed, the current range is determined based on the current battery level and current resource use. The monitoring of the current range and the distance to the destination 210 may be continuous, dynamic, and/or at intervals. For example, the current range and the distance to the destination 210 may be determined at a pre-determined time interval (e.g., once every minute). As another example, the current range and the distance to the destination 210 may be determined in response to an event, such as a change in a route, occupant input, a change in the vehicle's 204 velocity, or another event.

Figure 2B:
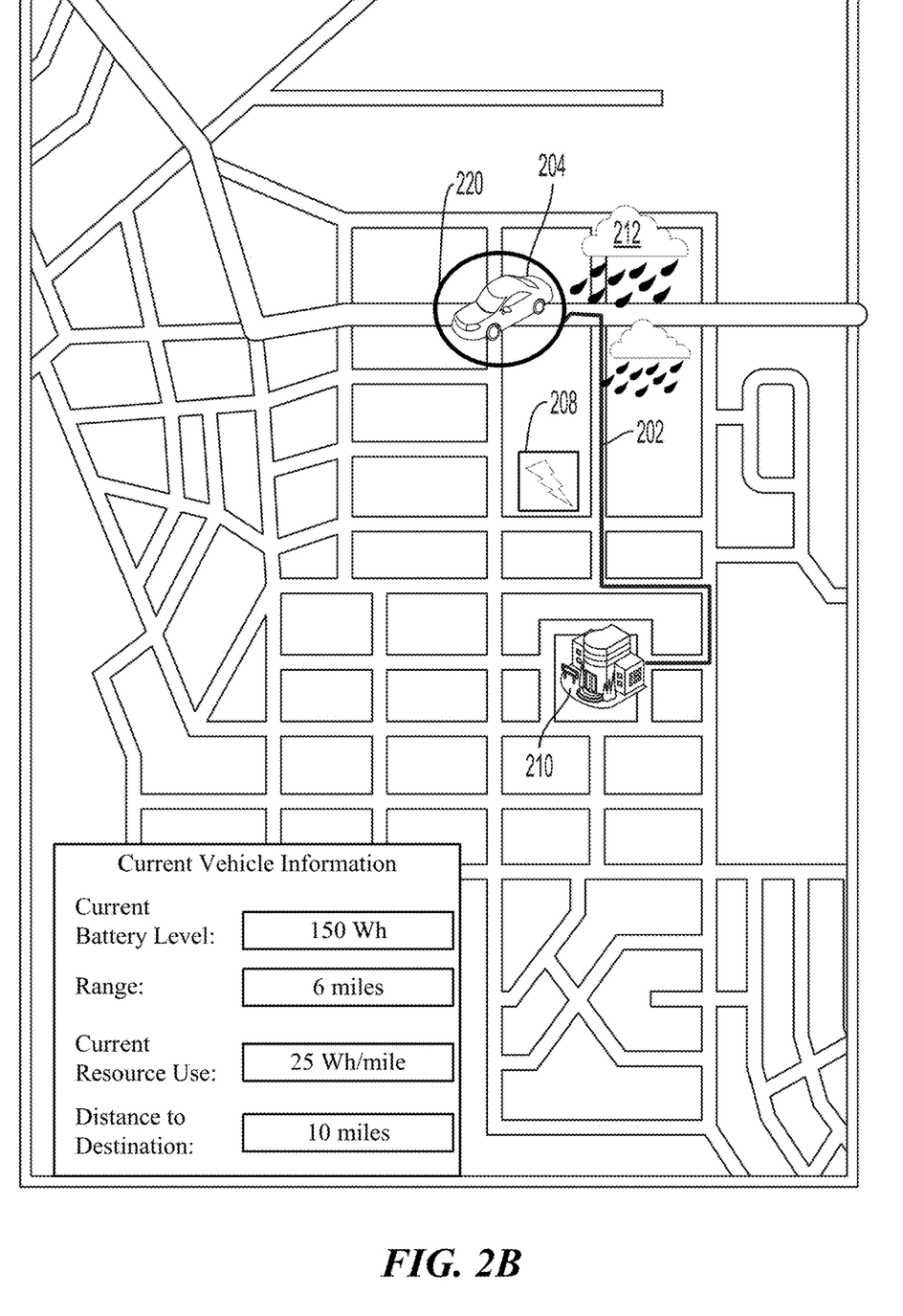

FIG. 2B illustrates an example of adjusting an operating mode of a vehicle 204 according to aspects of the present disclosure. As shown in FIG. 2B, the vehicle 204 is traveling along the route 202 to the destination 210. In this example, a rainstorm 212 may be present along a section of the route 202. As a result of the rainstorm 212, the velocity of the vehicle 204 may be reduced at an intermediate location 220 along the route 202.

For example, the vehicle 204 may be stuck in traffic due to the rainstorm 212. As a result of the reduced velocity, the vehicle's 204 time to the destination 210 may be delayed. Additionally, the reduced velocity may also increase resource use. For example, the sensors may be obtaining additional information due to the rain. Additionally, an amount of resources obtained from regenerative braking may be reduced due to the decreased velocity.

As shown in FIG. 2B, at the intermediate location 220, the current battery level is 150 watt-hours (Wh), the current resource use is 25 Wh/mile, the range is 6 miles, and the distance to the destination 210 is 10 miles. Based on the monitoring of the current range and the distance to the destination 210, the vehicle operating mode system determines if the range is greater than, less than, or equal to the distance to the destination 210.

For safety reasons (e.g., to account for errors), the difference between the range and the distance to the destination 210 may need to be greater than a threshold to allow the vehicle 204 to proceed to the destination 210. For example, if the difference between the range the distance to the destination 210 is between zero and a threshold value, the vehicle operating mode system may not permit the vehicle to proceed in the autonomous mode. Alternatively, if the difference between the range the distance to the destination 210 is between zero and the threshold value, the vehicle operating mode system may only permit the vehicle to navigate to a charging station 208 in the autonomous mode.

When the range is less than the distance to the destination 210, the vehicle operating mode system determines if the vehicle 204 may reach the destination by changing to a new operating mode, such as a manual mode. In one configuration, the vehicle operating mode system estimates the resource use for the vehicle 204 operating in the manual mode. In this example, the resource use in the manual mode may be 5 Wh/mile. Accordingly, the range in the manual mode would be 30 miles. Therefore, for the manual mode, the range may be greater than the distance to the destination 210.

In this example, because the range in the autonomous mode is less than the distance to the destination 210, the vehicle operating mode system prompts the occupant to switch to the manual mode. The occupant may provide an input to confirm the request to switch to the manual mode. After confirming the request, the occupant would navigate the remainder of the route in the manual mode. In some cases, the occupant may not be capable of operating the route in the manual mode. For example, the occupant may be sleeping, distracted, or not authorized to operate the vehicle 204.

In one configuration, prior to navigating the route 202, the vehicle operating mode system determines whether the occupant is capable of operating the vehicle 204. The ability to operate the vehicle 204 may be determined from information, such as driver's license information, stored in an occupant's profile. The occupant's profile may be obtained from one or more sources, such as a mobile device or a profile server, when the occupant reserves the vehicle 204 or enters the vehicle 204. In one configuration, the vehicle uses a scanner, or camera, to scan each occupant's driver's license to determine whether one or more occupants are able to operate the vehicle 204.

If the vehicle operating mode system determines that none of the occupants are capable of operating the vehicle 204, the vehicle operating mode system does not prompt the occupants to enter the manual mode. Rather, the vehicle operating mode system commands the route planning system to autonomously navigate to the nearest charging station 208. In another configuration, the occupant does not provide an input to confirm the request to switch to the manual mode. When the confirmation is not received, the vehicle operating mode system autonomously navigates to the nearest charging station 208.

In another example, after estimating the resource use for the vehicle 204 operating in the manual mode, the vehicle operating mode system determines the range may still be less than the distance to the destination 210. In this example, the vehicle operating mode system commands the route planning system to plan a route to the nearest charging station 208. Depending on the available range and the distance to the charging station 208, the vehicle 204 may navigate to the charging station 208 in a manual mode, semi-autonomous mode, or autonomous mode. The nearest charging station 208 may be determined from navigation information stored at the vehicle 204 or obtained from a remote device (e.g., the Internet).

Aspects of the present disclosure are not limited to determining electrical resources. Other types of resources are contemplated, such as gasoline or hydrogen. The resources may be a combination of one or more types of resources, such as gasoline and electricity. In one configuration, to reduce resource use in the manual mode (e.g., extend a range) the vehicle operating mode system may selectively disable non-essential components, such as a radio or climate control.

Figure 3:
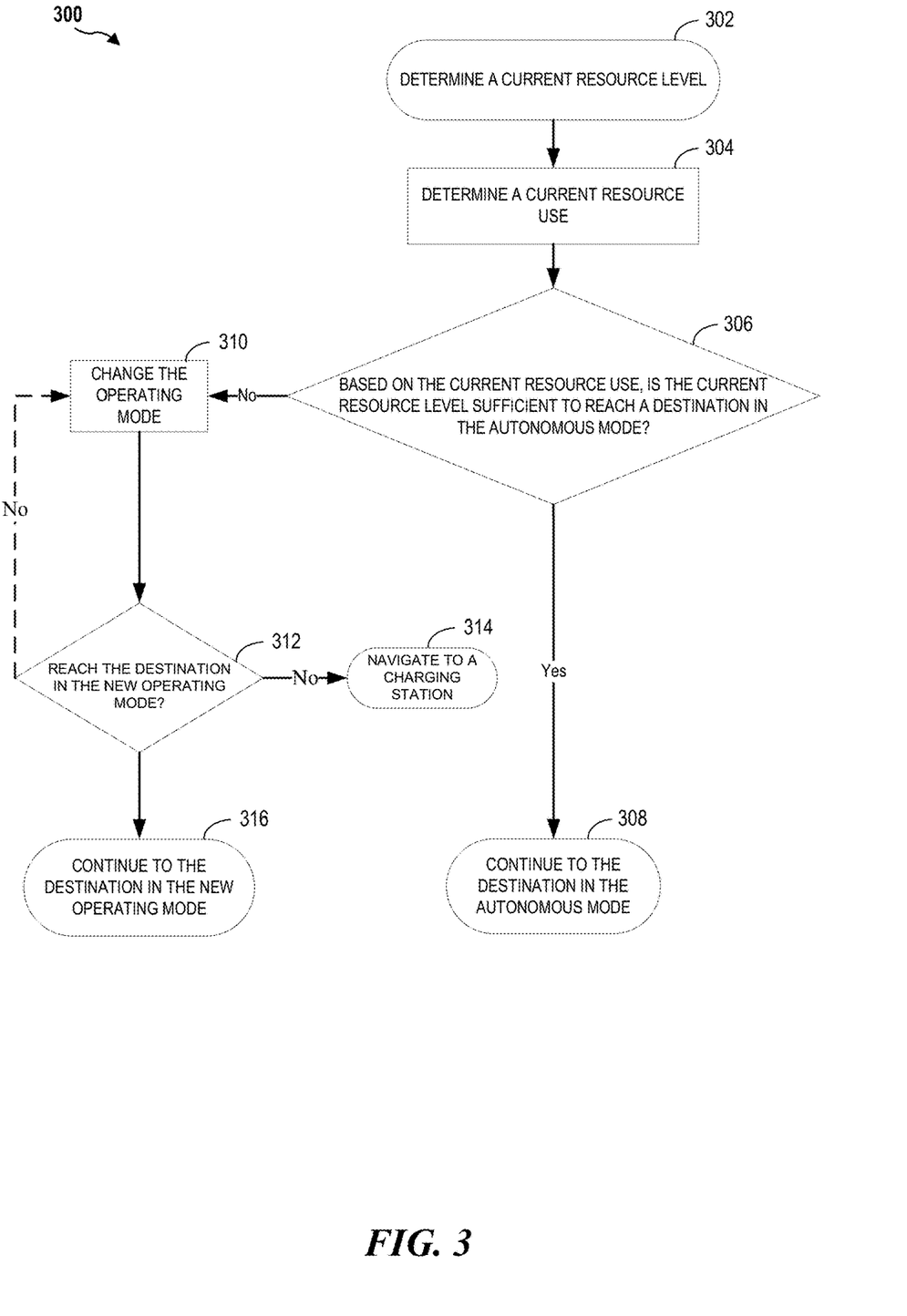
FIG. 3 illustrates a flow diagram for adjusting an operating mode of a vehicle according to aspects of the present disclosure.

FIG. 3 illustrates a flow diagram 300 for adjusting a vehicle operating mode according to aspects of the present disclosure. As shown in FIG. 3, at block 302, a vehicle operating mode system determines a current resource level.

The resource level may be determined in response to an occupant providing a destination to a vehicle. Additionally, or alternatively, the resource level may be continuously determined, determined in response to an event, and/or determined at an interval.

For example, the resource level may be determined at a pre-determined time interval (e.g., once every minute). As another example, the resource level may be determined in response to an event, such as a change in a route, occupant input, a change in the vehicle's velocity, or another event. In this example, the vehicle is autonomously navigating the route, and the resource level is determined while the vehicle is on the route.

The resource level refers to the level of one or more resources used to power one or more motors of the vehicle. The resources may also be used to power one or more sensors and/or modules of the vehicle. The resources may include electricity, gasoline, hydrogen, and/or any other type of resource.

At block 304, the vehicle operating mode system determines the vehicle's current resource use. The resource use refers to an amount of resources used to power the motor, sensors, and modules of the vehicle. For an electric vehicle, the resource use may be determined as watt-hours (Whs) or kilowatt-hours (kWhs). The Whs and/or kWhs may be determined for the unit of time (e.g., hours) or distance (e.g., miles or kilometers). For gasoline, the resource use may be determined for miles or kilometers per gallon or liter. The current resource use may be determined when the vehicle determines the current resource level.

At block 306, the vehicle operating mode system determines, based on the current resource use, whether the current resource level is sufficient to reach the destination. Specifically, the vehicle operating mode system determines a distance to the destination based on information provided by a location module, route planning module, and/or navigation module. Furthermore, based on the current resource use and the current resource level, the vehicle operating mode system determines the vehicle's range (e.g., a distance that may be traveled).

The vehicle operating mode system determines if the current range is greater than, less than, or equal to the distance to the destination. If the current range is greater than the distance to the destination, the vehicle may proceed to the destination in the autonomous mode (block 308). If the current range is less than the distance to the destination, the operating mode may be changed to another operating mode, such as a manual mode or a semi-autonomous mode (block 310).

If the current range is equal to the distance to the destination, the subsequent action may be dependent on a user preference or a manufacturer setting. For example, the user may enable a conservative setting to switch the operating mode or navigate to a charging station when the current range is equal to the distance to the destination. As another example, the user may enable an aggressive setting to navigate to the destination in the autonomous mode when the current range is equal to the distance to the destination.

In the example of FIG. 3, after changing the operating mode (block 310), the vehicle operating mode system determines if the vehicle can reach the destination in the new operating mode. That is, the vehicle operating mode system estimates the range of the vehicle based on an estimated resource use of the new operating mode. The resource use may be estimated based on historical information of resource use in the new operating mode. The historical information may be based on the current driver's driving habit or an average driver's driving habit.

In one configuration, the order of operations of block 310 and 312 may be switched. That is, the vehicle operating mode system may estimate the range of the new operating mode prior to changing to the new operating mode. If the estimated range of the new operating mode is greater than the distance to the destination, the vehicle operating mode system may navigate to the destination in the new operating mode (block 316). If the estimated range of the new operating mode is less than the distance to the destination, the vehicle operating mode system may estimate a range for another operating mode.

For example, the vehicle operating mode system may first estimate a range for a semi-autonomous mode. If the estimated range of the semi-autonomous mode is less than the distance to the destination, the vehicle operating mode system may then estimate a range for a manual mode. Alternatively, the vehicle operating mode system may only estimate a range for one operation mode, such as the manual mode.

As shown in FIG. 3, at block 312, in an optional configuration, if the vehicle cannot reach the destination in the new operating mode, the vehicle operating mode system changes the operating mode again (block 310), and repeats the process (block 312). Alternatively, if the vehicle cannot reach the destination in the new operating mode, the vehicle operating mode system commands a navigation module, route planning module, and/or another module to navigate the vehicle to a charging station (block 314). Depending on the distance to the charging station and the range available for each mode, the vehicle may navigate to the charging station in a manual mode, semi-autonomous mode, or autonomous mode.

As discussed, prior to embarking on a route, the vehicle operating mode system may determine whether one or more occupants are authorized to operate the vehicle in the manual mode or semi-autonomous mode. If one or more occupants are not authorized to operate the vehicle in the manual mode or semi-autonomous mode, the vehicle operating mode system may bypass blocks 310 and 312. As such, the vehicle operating mode system commands the vehicle to navigate to the charging station (block 314) in the autonomous mode.

In another example, after the vehicle operating mode system may prompt an occupant for a confirmation input prior to changing the operating mode. The occupant may be distracted (e.g., sleeping) and may not respond to the prompt. If the occupant does not respond to the prompt, the vehicle operating mode system may bypass blocks 310 and 312. As such, the vehicle operating mode system commands the vehicle to navigate to the charging station (block 314) in the autonomous mode.

Figure 4:
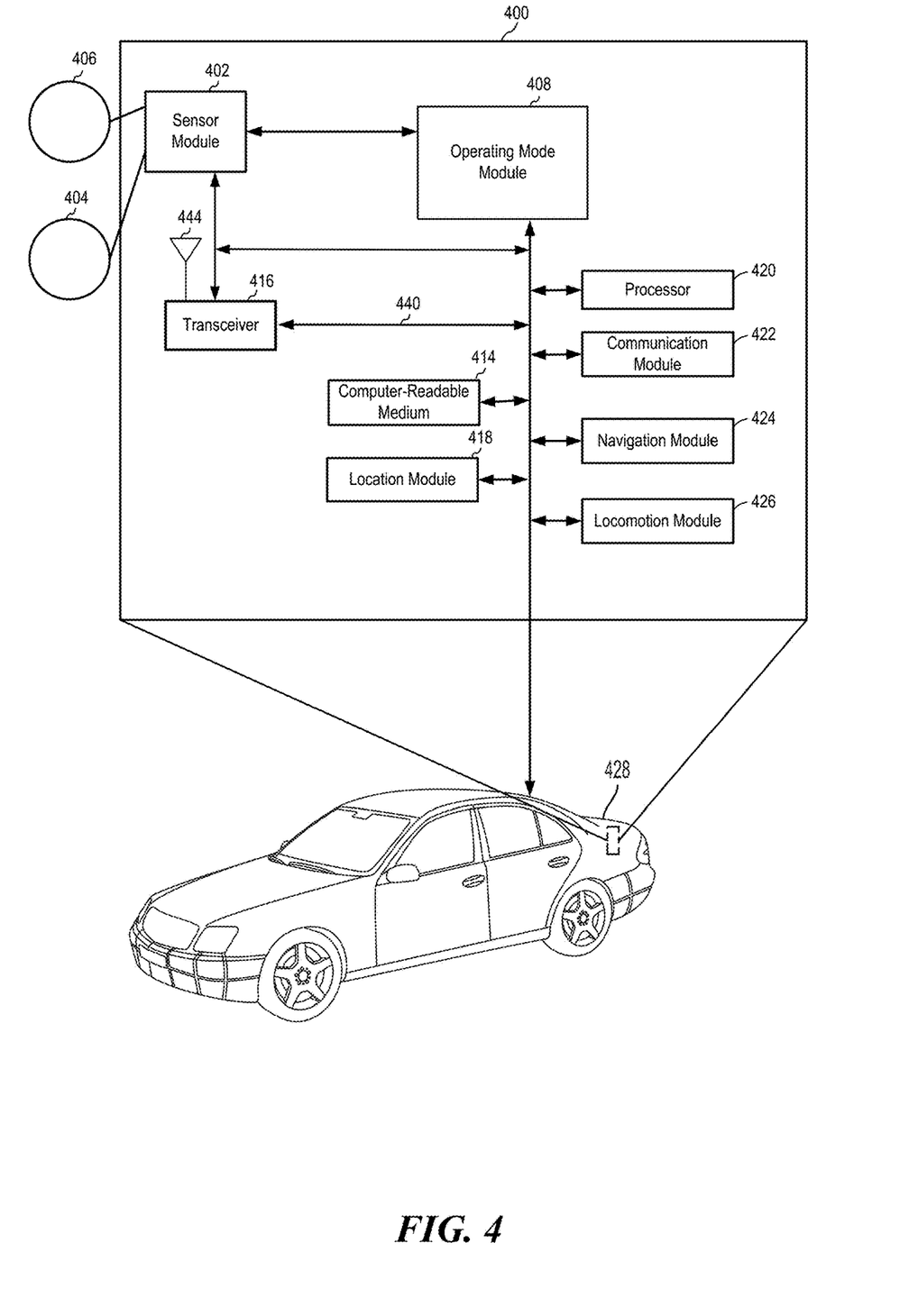
FIG. 4 is a diagram illustrating an example of a hardware implementation for a vehicle operating mode system according to aspects of the present disclosure.

FIG. 4 is a diagram illustrating an example of a hardware implementation for a vehicle operating mode system 400, according to aspects of the present disclosure. The vehicle operating mode system 400 may be a component of a vehicle, a robotic device, or another device. For example, as shown in FIG. 4, the vehicle operating mode system 400 is a component of a vehicle 428. The vehicle 428 may be an MAAS vehicle or a personal use vehicle. Aspects of the present disclosure are not limited to the vehicle operating mode system 400 being a component of the vehicle 428, as other devices, such as a bus, boat, drone, or robot, are also contemplated for using the vehicle operating mode system 400.

The vehicle 428 may operate in at least an autonomous operating mode and a manual operating mode. Other operating modes, such as semi-autonomous are also contemplated. Furthermore, the vehicle 428 may be an electric vehicle, a hybrid vehicle, a fuel vehicle, or another type of vehicle.

The vehicle operating mode system 400 may be implemented with a bus architecture, represented generally by a bus 440. The bus 440 may include any number of interconnecting buses and bridges depending on the specific application of the vehicle operating mode system 400 and the overall design constraints. The bus 440 links together various circuits including one or more processors and/or hardware modules, represented by a processor 420, a communication module 422, a location module 418, a sensor module 402, a locomotion module 426, a navigation module 424, and a computer-readable medium 414. The bus 440 may also link various other circuits such as timing sources, peripherals, voltage regulators, and power management circuits, which are well known in the art, and therefore, will not be described any further.

The vehicle operating mode system 400 includes a transceiver 416 coupled to the processor 420, the sensor module 402, an operating mode module 408, the communication module 422, the location module 418, the locomotion module 426, the navigation module 424, and the computer-readable medium 414. The transceiver 416 is coupled to an antenna 444. The transceiver 416 communicates with various other devices over a transmission medium. For example, the transceiver 416 may receive commands via transmissions from a user or a remote device. As another example, the transceiver 416 may transmit driving statistics and information from the operating mode module 408 to a server (not shown).

The vehicle operating mode system 400 includes the processor 420 coupled to the computer-readable medium 414. The processor 420 performs processing, including the execution of software stored on the computer-readable medium 414 providing functionality according to the disclosure. The software, when executed by the processor 420, causes the vehicle operating mode system 400 to perform the various functions described for a particular device, such as the vehicle 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or a red-green-blue (RGB) camera, for capturing 2D images. The second sensor 404 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 404, 406.

The measurements of the first sensor 406 and the second sensor 404 may be processed by one or more of the processor 420, the sensor module 402, the operating mode module 408, the communication module 422, the location module 418, the locomotion module 426, the navigation module 424, in conjunction with the computer-readable medium 414 to implement the functionality described herein. In one configuration, the data captured by the first sensor 406 and the second sensor 404 may be transmitted to an external device via the transceiver 416. The first sensor 406 and the second sensor 404 may be coupled to the vehicle 428 or may be in communication with the vehicle 428.

The location module 418 may be used to determine a location of the vehicle 428. For example, the location module 418 may use a global positioning system (GPS) to determine the location of the vehicle 428. The communication module 422 may be used to facilitate communications via the transceiver 416. For example, the communication module 422 may be configured to provide communication capabilities via different wireless protocols, such as WiFi, long term evolution (LTE), 4G, etc. The communication module 422 may also be used to communicate with other components of the vehicle 428 that are not modules of the vehicle operating mode system 400.

The locomotion module 426 may be used to facilitate locomotion of the vehicle 428. As an example, the locomotion module 426 may control a movement of the wheels. As another example, the locomotion module 426 may be in communication with one or more power sources of the vehicle 428, such as a motor and/or batteries. Of course, aspects of the present disclosure are not limited to providing locomotion via wheels and are contemplated for other types of components for providing locomotion, such as propellers, treads, fins, and/or jet engines.

The vehicle operating mode system 400 also includes the navigation module 424 for planning a route or controlling the locomotion of the vehicle 428, via the locomotion module 426. A route may be planned to a passenger based on compartment data provided via the operating mode module 408. In one configuration, the navigation module 424 overrides the user input when the user input is expected (e.g., predicted) to cause a collision. The modules may be software modules running in the processor 420, resident/stored in the computer-readable medium 414, one or more hardware modules coupled to the processor 420, or some combination thereof.

The operating mode module 408 may be in communication with the sensor module 402, the transceiver 416, the processor 420, the communication module 422, the location module 418, the locomotion module 426, the navigation module 424, and the computer-readable medium 414. In one configuration, the operating mode module 408 receives sensor data from the sensor module 402. The sensor module 402 may receive the sensor data from the first sensor 406 and the second sensor 404. According to aspects of the present disclosure, the sensor module 402 may filter the data to remove noise, encode the data, decode the data, merge the data, extract frames, or perform other functions. In an alternate configuration, the operating mode module 408 may receive sensor data directly from the first sensor 406 and the second sensor 404.

In one configuration, the operating mode module 408 determines a current resource use and a current resource level from the processor 420, the location module 418, the computer-readable medium 414, the locomotion module 426, and/or the navigation module 424. The operating mode module 408 may also obtain the current resource level from one or more resource modules (not shown), such as a battery or fuel tank. The operating mode module 408 may also determine a distance to a destination from the processor 420, the location module 418, the computer-readable medium 414, the locomotion module 426, and/or the navigation module 424.

Based on the distance to the destination, the current resource use, and the current resource level, the operating mode module 408 may determine whether a current range is less than, greater than, or equal to the distance to the destination. The operating mode module 408 may also determine the vehicle's 428 current operating mode from the processor 420 and/or the computer-readable medium 414. The operating mode module 408 may change the current operating mode based on the current range and the distance to the destination.

For example, the operating mode module 408 may change an autonomous operating mode to a manual operating mode if the current range is less than or equal to the distance to the destination. The operating mode module 408 may estimate a range of a new operating mode based on information obtained from the processor 420, the location module 418, the computer-readable medium 414, the locomotion module 426, and/or the navigation module 424. If the range of the new operating mode is not sufficient to reach the destination, the operating mode module 408 may change the destination to a charging station. The operating mode module 408 may communicate with the processor 420, the location module 418, the computer-readable medium 414, the locomotion module 426, and/or the navigation module 424 to determine a charging station (e.g., a nearest charging station) and to navigate the vehicle 428 to the charging station.

The operating mode module 408 may also obtain occupant information. For example, the operating mode module 408 may obtain driver's license information for one or more occupants. The occupant information may be received from a sensor 406, 404 such as an internal camera or scanner. Additionally, or alternatively, the occupant information may be obtained from a remote source via the transceiver 416 and/or the communication module 422.

Figure 5:
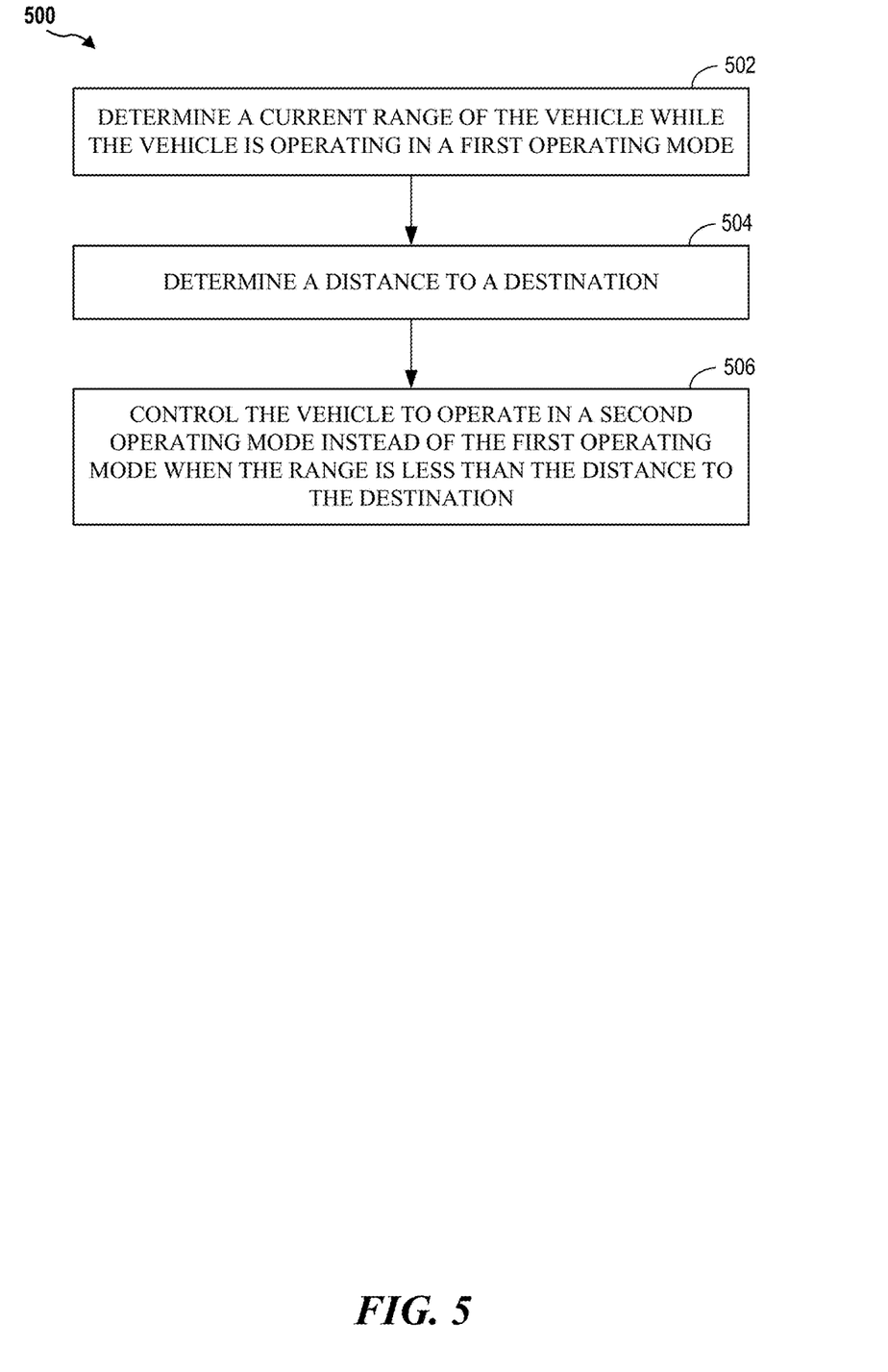
FIG. 5 illustrates a flow diagram for a method of adjusting an operating mode of a vehicle according to aspects of the present disclosure.

FIG. 5 illustrates a flow diagram 500 for controlling an operating mode of a vehicle according to aspects of the present disclosure. As shown in FIG. 5, at block 502 an operating mode system (e.g., operating mode module) of the vehicle determines a current range of the vehicle while the vehicle is operating in a first operating mode. In one configuration, the operating mode system determines a current resource level and a current resource use. The current range may be determined based on the current resource level and the current resource use.

The resource level may include a current battery level and the current resource use may include a current electrical use of the vehicle. The resources are not limited to electrical resources and may include other types of resources. For example, the other types of resources may include gasoline, hydrogen, or other types of fuel.

At block 504, the operating mode system determines a distance to a destination. The distance may be determined based on information provided by a navigation module and/or a location module. At block 506, the operating mode system controls the vehicle to operate in a second operating mode instead of the first operating mode when the range is less than the distance to the destination. The second operating mode may be a manual operating mode or a semi-autonomous operating mode. That is, in one configuration, the vehicle is operated by a human in the second operating mode. The first operating mode may be an autonomous mode.

In one configuration, prior to changing the operating mode, the operating mode system determines whether a range of the second mode is less than the distance to the destination. In this configuration, the operating mode system controls the vehicle to navigate to a charging station when the range of the second mode is less than the distance to the destination. A location of the charging station may be determined via a navigation module. Based on the type of resources used by the vehicle, the vehicle may be controlled to navigate to another type of station, such as a gas station.

In one configuration, prior to changing the operating mode, the operating mode system determines whether one of the occupants is authorized to operate the vehicle in the second operating mode. In this configuration, the operating mode system controls the vehicle to navigate to a charging station in the first mode when the current range is less than the distance to the destination and none of the occupants are authorized to operate the vehicle in the second mode. The operating mode system may determine the authorized to operate the vehicle in the second operating mode based on driver's license information.

In one configuration, prior to changing the operating mode, the operating mode system prompts an occupant to confirm operating in the second operating mode. In this configuration, the operating mode system controls the vehicle to operate in the second operating mode in response to receiving a conformation input from the occupant. The vehicle may remain in the first operating mode when a confirmation is not received.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling an operating mode of a vehicle, comprising:
   navigating to a destination in an autonomous operating mode based on receiving, from a user equipment (UE) associated with a customer, a reservation message that requests a ride to the destination, the reservation message further indicating customer information associated with the customer;
   determining a first difference between a current range of the vehicle and a distance to the destination is less than a threshold range value, the threshold range value being greater than zero;
   determining a manual operating range associated with a manual operating mode of the vehicle based on the first difference being less than the threshold range value;
   determining a second difference between the manual operating range and the distance to the destination is greater than the threshold range value;
   determining, via the customer information, whether the customer is authorized to operate the vehicle in a manual operating mode based on the second difference being greater than the threshold range value;
   prompting the customer for a confirmation input to change to the manual operating mode if the customer is authorized to operate the vehicle in the manual operating mode; and
   controlling the vehicle to autonomously navigate to a charging station based on:
      the first difference being less than the threshold range value; and
      a failure to receive the confirmation input or the customer being not authorized to operate the vehicle in the manual operating mode.

2. The method of claim 1, further comprising:
   determining a current resource level; and
   determining a current resource use, in which the current range is based on the current resource level and the current resource use.

3. The method of claim 2, in which:
   the resource level comprises a current battery level; and
   the current resource use comprises a current electrical use of the vehicle.

4. The method of claim 1, in which the vehicle is operated by a human driver in the manual operating mode.

5. An apparatus for controlling an operating mode of a vehicle, the apparatus comprising:
   a memory;
   at least one processor coupled to the memory; and
   instructions stored in the memory and operable, when executed by the at least one processor, to cause the apparatus to:
      navigate to a destination in an autonomous operating mode based on receiving, from a user equipment (UE) associated with a customer, a reservation message that requests a ride to the destination, the reservation message further indicating customer information associated with the customer;
      to determine a first difference between a current range of the vehicle and a distance to the destination is less than a threshold range value, the threshold range value being greater than zero;
      to determine a manual operating range associated with a manual operating mode of the vehicle based on the first difference being less than the threshold range value;
      to determine a second difference between the manual operating range and the distance to the destination is greater than the threshold range value;
      to determine, via the customer information, whether the customer is authorized to operate the vehicle in a manual operating mode based on the second difference being greater than the threshold range value;
      to prompt the customer for a confirmation input to change to the manual operating mode if the customer is authorized to operate the vehicle in the manual operating mode; and
      to control the vehicle to autonomously navigate to a charging station based on:
         the first difference being less than the threshold range value; and
         a failure to receive the confirmation input or the customer being not authorized to operate the vehicle in the manual operating mode.

6. The apparatus of claim 5, in which:
   execution of the instructions further cause the apparatus:
      to determine a current resource level; and
      to determine a current resource use; and
   the current range is based on the current resource level and the current resource use.

7. The apparatus of claim 6, in which:
   the resource level comprises a current battery level; and
   the current resource use comprises a current electrical use of the vehicle.

8. The apparatus of claim 5, in which the vehicle is operated by a human driver in the manual operating mode.

9. A non-transitory computer-readable medium having program code recorded thereon for controlling an operating mode of a vehicle, the program code executed by a processor and comprising:
   program code to navigate to a destination in an autonomous operating mode based on receiving, from a user equipment (UE) associated with a customer, a reservation message that requests a ride to the destination, the reservation message further indicating customer information associated with the customer;
   program code to determine a first difference between a current range of the vehicle and a distance to the destination is less than a threshold range value, the threshold range value being greater than zero;
   program code to determine a manual operating range associated with a manual operating mode of the vehicle based on the first difference being less than the threshold range value;
   program code to determine a second difference between the manual operating range and the distance to the destination is greater than the threshold range value;
   program code to determine, via the customer information, whether the customer is authorized to operate the vehicle in a manual operating mode based on the second difference being greater than the threshold range value;
   program code to prompt the customer for a confirmation input to change to the manual operating mode if the customer is authorized to operate the vehicle in the manual operating mode; and
   program code to control the vehicle to autonomously navigate to a charging station based on:

the first difference being less than the threshold range value; and a failure to receive the confirmation input or the customer being not authorized to operate the vehicle in the manual operating mode.

10. The non-transitory computer-readable medium of claim 9, in which the program code further comprises:

program code to determine a current resource level; and program code to determine a current resource use, in which the current range is based on the current resource level and the current resource use.

11. The non-transitory computer-readable medium of claim 9, in which the vehicle is operated by a human driver in the manual operating mode.

\* \* \* \* \*